US009978093B2

(12) United States Patent
Pang et al.

(10) Patent No.: US 9,978,093 B2
(45) Date of Patent: May 22, 2018

(54) METHOD AND SYSTEM FOR PUSHING MOBILE APPLICATION

(71) Applicant: Baidu Online Network Technology (Beijing) Co., Ltd, Beijing (CN)

(72) Inventors: Wenbo Pang, Beijing (CN); Kai Yang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 755 days.

(21) Appl. No.: 14/411,846

(22) PCT Filed: Nov. 7, 2013

(86) PCT No.: PCT/CN2013/086685
§ 371 (c)(1),
(2) Date: Dec. 29, 2014

(87) PCT Pub. No.: WO2014/090057
PCT Pub. Date: Jun. 19, 2014

(65) Prior Publication Data
US 2015/0332373 A1 Nov. 19, 2015

(30) Foreign Application Priority Data

Dec. 14, 2012 (CN) .......................... 2012 1 0546055

(51) Int. Cl.
*G06Q 30/00* (2012.01)
*G06Q 30/06* (2012.01)
(52) U.S. Cl.
CPC ................ *G06Q 30/0631* (2013.01)
(58) Field of Classification Search
CPC .......................................... G06Q 30/06–30/08
(Continued)

(56) References Cited

U.S. PATENT DOCUMENTS

2001/0014868 A1* 8/2001 Herz ................ G06Q 10/0637
705/14.38
2009/0077499 A1* 3/2009 Svendsen .......... G06F 17/30035
715/833
2014/0052683 A1* 2/2014 Kirkham ............ G06Q 30/0631
706/46

FOREIGN PATENT DOCUMENTS

CN 101814068 A 8/2010
CN 102026151 A 4/2011
(Continued)

OTHER PUBLICATIONS

"AisleBuyer Revolutionizes In-Store Point-of-Decision Marketing with mPromo" (Business Wire, Dec. 12, 2011) https://dialog.proquest.com/professional/docview/910447212?accountid=142257 (Year: 2011).*

(Continued)

*Primary Examiner* — Ethan D Civan
(74) *Attorney, Agent, or Firm* — Orrick, Herrington & Sutcliffe LLP

(57) ABSTRACT

Provided are a method and system for pushing a mobile application. The method comprises: determining more than one mobile application category with the highest relevance to a mobile application category to which a mobile application designated by a user belongs; according to the pre-generated weight value of the mobile application, calculating and determining the degree of recommendation of each mobile application under the mobile application category; and according to the principle of high to low of the determined degrees of recommendation of each mobile application under the mobile application category, selecting a preset recommendation result number of the mobile applications as a recommendation result and pushing same to a user. According to the technical solution provided in the present (Continued)

invention, the diversity of recommended mobile applications can be effectively improved.

20 Claims, 2 Drawing Sheets

(58) Field of Classification Search
USPC .............................................. 705/26.1–27.2
See application file for complete search history.

(56) References Cited

FOREIGN PATENT DOCUMENTS

| | | |
|---|---|---|
| CN | 103020845 A | 4/2013 |
| JP | 2010-198603 | 9/2010 |

OTHER PUBLICATIONS

CN, International Search Report, PCT/CN2013/086685, dated Feb. 20, 2014.
JP, Japanese Office Action, Japanese Patent Application No. 2015-46823, dated Jun. 20, 2017.
EP, European Examination Report, European Application No. 13863276.5, dated Oct. 21, 2016.
EP, Extended European Search Report, European Application No. 13863276.5, dated Apr. 4, 2016.

* cited by examiner

According to information about a user viewing or downloading a mobile application in a mobile application store and duration information about the user using the mobile application, calculating the relevance between mobile applications in a mobile application set which is viewed, downloaded and used by the user ⸺ 101

According to a mobile application ontology base, obtaining category information about the mobile applications in the mobile application set, and according to the category information about the mobile applications, classifying the mobile applications; and according to information about a user viewing or downloading a mobile application in a mobile application store, duration information about the user using the mobile application, and the calculated relevance between the mobile applications, calculating the relevance between mobile application categories ⸺ 102

Adding a newly added mobile application in the mobile application store to a mobile application ontology base, and labeling corresponding category information and attribute information for the newly added mobile application ⸺ 103

According to information about a user viewing or downloading a mobile application in a mobile application store and duration information about the user using the mobile application, calculating weight values of mobile applications which are not newly added under the mobile application category in the ontology base; and multiplying an average weight value of top-ranked mobile applications under the mobile application category to which the newly added mobile application belongs by a preset attenuation factor, so as to obtain a weight value of the newly added mobile application ⸺ 104

When a mobile application designated by the user is received, according to the relevance of the mobile application categories, determining more than one mobile application category with the highest relevance to the mobile application category of the designated mobile application; according to weight values of mobile applications, calculating the degrees of recommendation of the mobile applications under the mobile application category; and extracting mobile applications with top-ranked degrees of recommendation under each mobile application category, and according to a preset number of recommendation results, taking more than one mobile application with the highest degree of recommendation in the extracted mobile applications as recommendation results and pushing same to the user ⸺ 105

*Fig. 1*

METHOD AND SYSTEM FOR PUSHING MOBILE APPLICATION

CROSS REFERENCE TO RELATED APPLICATIONS

This application is a national stage filing of International Patent Application No. PCT/CN2013/086685, filed on Nov. 7, 2013, which claims priority to Chinese Patent Application No. 201210546055.3, filed on Dec. 14, 2012, and entitled "Method and System for Pushing Mobile Application," the contents of which are incorporated herein by reference in their entireties and for all purposes.

TECHNICAL FIELD

The present invention relates to the field of Internet applications, and in particular to a method and system for pushing a mobile application.

BACKGROUND

At present, all mobile application stores will push some mobile applications to a user when the user downloads or browses an application, so as to recommend mobile applications to the user; the push method is to take statistics of the relevance between mobile applications according to a user history log, and then generate a recommendation result according to the relevance and using recommendation algorithms such as neighbor and collaborative filtering; therefore, the relevance between mobile applications is taken as a recommendation basis to recommend mobile applications in the prior art.

Therefore, at present, the following problems exist in the recommendation method of mobile applications:

1. since the relevance between mobile applications is always taken as a recommendation basis, this makes the contents of the recommended mobile applications too similar to each other, and a variety of mobile applications cannot be recommended to the user, and thus the needs of the user for mobile applications cannot be stimulated.

2. Since newly added mobile applications do not have a user history log, the statistics of the relevance between the newly added mobile applications and other mobile applications cannot be taken; therefore, the newly added mobile applications cannot be recommended to the user when the user views or downloads mobile applications, and the cold start problem of the newly added mobile applications cannot be solved.

SUMMARY

Provided in the present invention is a method and system for pushing a mobile application, which can effectively improve the diversity of recommended mobile applications.

The specific technical solution of the present invention is as follows:

provided in the present invention is a method for pushing a mobile application, and the method comprises:

determining more than one mobile application category with the highest relevance to a mobile application category to which a mobile application designated by a user belongs;

calculating, according to pre-generated weight values of mobile applications, the degree of recommendation of each mobile application under the determined mobile application category; and selecting, according to the principle of high to low of the degree of recommendation of each mobile application under the determined mobile application category, a preset recommendation result number of mobile applications as a recommendation result and pushing same to the user.

According to a preferred embodiment of the present invention, the method for determining the relevance between mobile application categories is:

classifying, according to category information about each mobile application in a mobile application ontology base, mobile applications operated by each user; and calculating, according to information about the mobile applications operated by each user in a mobile application store and the pre-generated relevance between mobile applications, the relevance between the mobile application categories.

According to a preferred embodiment of the present invention, the method for pre-generating the relevance between mobile applications is:

calculating the relevance $R(app_m, app_n)$ between the mobile applications $app_m$ and $app_n$ using the following formula:

$$R(app_m, app_n) = \sum_{u=1}^{U} w_u \times \frac{s_{app_m} \times (k_1 + 1)}{s_{app_m} + K} \times \frac{s_{app_n} \times (k_2 + 1)}{s_{app_n} + k_2}$$

where U represents a user set operating the mobile application $app_m$ and the mobile application $app_n$ simultaneously, and $s_{app_m}$ and $s_{app_n}$ respectively represent score values allocated by a user u in the user set U for the $app_m$ and $app_n$; $w_u$ represents the weight of the user u in the user set U, $$K = k_1 \times \left(1 - b + b \times \frac{n_u}{n_{avg}}\right),$$

$k_1$ and $k_2$ are preset adjustment factors, $n_u$ represents the total number of mobile applications operated by the user u in the user set U, and $n_{avg}$ represents an average value of the total number of mobile applications operated by the user u.

According to a preferred embodiment of the present invention, the weight $w_u$ of the user u in the user set U is $$w_u = \log \frac{N - n_u + 0.5}{n_u + 0.5},$$

where N represents the total number of mobile applications operated by each user.

According to a preferred embodiment of the present invention, the value $s_{app_m}$ allocated by the user u for the mobile application $app_m$ is:

$$s_{app_m} = \sum_{t=1}^{T} s_t \times B_{t, app_m};$$

where t represents the $t^{th}$ type of operating the mobile application $app_m$, T represents the total number of types of operating the mobile application $app_m$, and $s_t$ represents a basic score of the user u operating the mobile application $app_m$; $B_{t,app_m}$ is an indication value of whether the user u performs the $t^{th}$ type of operation on the mobile application $app_m$ or is duration information about the user u performing the $t^{th}$ type of operation on the mobile application $app_m$.

According to a preferred embodiment of the present invention, the method for calculating the relevance between mobile application categories is:

calculating the relevance $R(concept_i, concept_j)$ between the mobile application category $concept_i$ and the mobile application category $concept_j$ using the following formula:

$$R(concept_i, concept_j) = \sum_{\substack{concept_{app_m}=concept_i, \\ concept_{app_n}=concept_j}}^{U} \frac{f_{app_m app_n}}{f_{app_m} + f_{app_n}} \times R(app_m, app_n)$$

where $concept_i$ and $concept_j$ are respectively the mobile application categories to which the mobile application $app_m$ and the mobile application $app_n$ belong, $R(app_m, app_n)$ is the relevance between the mobile application $app_m$ and the mobile application $app_n$, $f_{app_m}$ represents the total number of users operating the mobile application $app_m$, $f_{app_n}$ represents the total number of users operating the mobile application $app_n$, and $f_{app_m app_n}$ represents the total number of users contained in an intersection of a user set operating the mobile application $app_m$ and a user set operating the mobile application $app_n$.

According to a preferred embodiment of the present invention, the method for pre-generating weight values of mobile applications is:

calculating the weight value $w_{concept_i app_m}$ of the mobile application $app_m$ in the mobile application category $concept_i$ using the following formula:

$$w_{concept_i app_m} = \sum_{t=1}^{T} g_t \times \frac{A_{t,app_m}}{A_{t,concept_i}}$$

where t represents the $t^{th}$ type of operating the mobile application $app_m$, T represents the total number of types of operating the mobile application $app_m$, $A_{t,app_m}$ represents the total number of times or the total duration of the mobile application $app_m$ being operated by the $t^{th}$ type in a user history log, $A_{t,concept_i}$ represents the total number of times or the total duration of all the mobile applications under the mobile application category $concept_i$ being operated by the $t^{th}$ type in the user history log; and $g_t$ represents an impact factor corresponding to the mobile application $app_m$ operated by the $t^{th}$ type in the user history log.

According to a preferred embodiment of the present invention, the operations on mobile applications comprise at least one of viewing, downloading and using.

According to a preferred embodiment of the present invention, the method further comprises:

adding a newly added mobile application in a mobile application store to a mobile application ontology base, and labelling corresponding category information and attribute information for the newly added mobile application; and multiplying an average weight value of top-ranked mobile applications under the mobile application category to which the newly added mobile application belongs by a preset attenuation factor, so as to obtain a weight value of the newly added mobile application.

According to a preferred embodiment of the present invention, the method for calculating the degree of recommendation of each mobile application under the determined mobile application category is:

calculating the degree of recommendation $rec_{app_m app_n}$ of recommending the mobile application $app_n$ to the user using the formula $rec_{app_m app_n} = R(concept_i, concept_j) \times w_{concept_j app_n} + k \times comatt(app_m, app_n)$ in the case where the designated mobile application is $app_m$;

where the mobile application category to which the mobile application $app_m$ belongs is $concept_i$, the mobile application category to which the mobile application $app_n$ belongs is $concept_j$, the mobile application category $concept_j$ belongs to the determined mobile application category, $R(concept_i, concept_j)$ is the relevance between the mobile application category $concept_i$ and the mobile application category $concept_j$, $w_{concept_j app_n}$ is the weight value of the mobile application $app_n$ under the mobile application category $concept_j$, $comatt(app_m, app_n)$ is the number of identical attributes of the mobile application $app_n$ and the mobile application $app_m$, and k is a preset impact factor.

According to a preferred embodiment of the present invention, according to the principle of high to low of the degree of recommendation of each mobile application under the determined mobile application category, selecting a preset recommendation result number of mobile applications as a recommendation result and pushing same to the user comprise:

respectively extracting mobile applications with top-ranked degrees of recommendation from the determined mobile application category; and ranking the extracted mobile applications in an order from high to low of the degrees of recommendation, and taking n top-ranked mobile applications as recommendation results of the mobile applications and pushing same to the user, n being a preset number of recommendation results.

Further provided in the present invention is a system for pushing a mobile application, and the system comprises: a statistical unit, a first calculation unit and a pushing unit; wherein, the statistical unit is used for determining more than one mobile application category with the highest relevance to a mobile application category to which a mobile application designated by a user belongs;

the first calculation unit is used for calculating, according to pre-generated weight values of mobile applications, the degree of recommendation of each mobile application under the mobile application category determined by the statistical unit;

and the pushing unit is used for selecting, according to the principle of high to low of the degree of recommendation of each mobile application under the mobile application category determined by the statistical unit, a preset recommendation result number of mobile applications as a recommendation result and pushing same to the user.

According to a preferred embodiment of the present invention, the system further comprises: a second calculation unit for pre-generating the relevance of mobile application categories, and specifically for:

classifying, according to category information about each mobile application in a mobile application ontology base, mobile applications operated by each user; and calculating, according to information about the mobile applications operated by each user in a mobile application store and the pre-generated relevance between mobile applications, the relevance between the mobile application categories.

According to a preferred embodiment of the present invention, the system further comprises: a third calculation unit for pre-generating the relevance between mobile applications, and specifically for:

calculating the relevance $R(app_m, app_n)$ between the mobile applications $app_m$ and $app_n$ using the following formula:

$$R(app_m, app_n) = \sum_{u=1}^{U} w_u \times \frac{s_{app_m} \times (k_1 + 1)}{s_{app_m} + K} \times \frac{s_{app_n} \times (k_2 + 1)}{s_{app_n} + k_2}$$

where U represents a user set operating the mobile application $app_m$ and the mobile application $app_n$ simultaneously, and $s_{app_m}$ and $s_{app_n}$ respectively represent score values allocated by a user u in the user set U for the $app_m$ and $app_n$; $w_u$ represents the weight of the user u in the user set U, $$K = k_1 \times \left(1 - b + b \times \frac{n_u}{n_{avg}}\right),$$

$k_1$ and $k_2$ are preset adjustment factors, $n_u$ represents the total number of mobile applications operated by the user u in the user set U, and $n_{avg}$ represents an average value of the total number of mobile applications operated by the user u.

According to a preferred embodiment of the present invention, the weight $w_u$ of the user u in the user set U is $$w_u = \log \frac{N - n_u + 0.5}{n_u + 0.5},$$

where N represents the total number of mobile applications operated by each user.

According to a preferred embodiment of the present invention, the value $s_{app_m}$ allocated by the user u for the mobile application $app_m$ is:

$$s_{app_m} = \sum_{t=1}^{T} s_t \times B_{t, app_m};$$

where t represents the $t^{th}$ type of operating the mobile application $app_m$, T represents the total number of types of operating the mobile application $app_m$, and $s_t$ represents a basic score of the user u operating the mobile application $app_m$; $B_{t, app_m}$ is an indication value of whether the user u performs the $t^{th}$ type of operation on the mobile application $app_m$ or is duration information about the user u performing the $t^{th}$ type of operation on the mobile application $app_m$.

According to a preferred embodiment of the present invention, when calculating the relevance between mobile application categories, the second calculation unit is specifically used for:

calculating the relevance $R(concept_i, concept_j)$ between the mobile application category $concept_i$ and the mobile application category $concept_j$ using the following formula:

$$R(concept_i, concept_j) = \sum_{\substack{concept_{app_m} = concept_i, \\ concept_{app_n} = concept_j}}^{U} \frac{f_{app_m app_n}}{f_{app_m} + f_{app_n}} \times R(app_m, app_n)$$

where $concept_i$ and $concept_j$ are respectively the mobile application categories to which the mobile application $app_m$ and the mobile application $app_n$ belong, $R(app_m, app_n)$ is the relevance between the mobile application $app_m$ and the mobile application $app_n$, $f_{app_m}$ represents the total number of users operating the mobile application $app_m$, $f_{app_n}$ represents the total number of users operating the mobile application $app_n$, and $f_{app_m app_n}$ represents the total number of users contained in an intersection of a user set operating the mobile application $app_m$ and a user set operating the mobile application $app_n$.

According to a preferred embodiment of the present invention, the system further comprises: a fourth calculation unit for pre-generating weight values of mobile applications, and specifically for:

calculating a weight value $w_{concept_i app_m}$ of the mobile application $app_m$ in the mobile application category $concept_i$ using the following formula:

$$w_{concept_i app_m} = \sum_{t=1}^{T} g_t \times \frac{A_{t, app_m}}{A_{t, concept_i}}$$

where t represents the $t^{th}$ type of operating the mobile application $app_m$, T represents the total number of types of operating the mobile application $app_m$, $A_{t, app_m}$ represents the total number of times or the total duration of the mobile application $app_m$ being operated by the $t^{th}$ type in a user history log, $A_{t, concept_i}$ represents the total number of times or the total duration of all the mobile applications under the mobile application category $concept_i$ being operated by the $t^{th}$ type in the user history log; and $g_t$ represents an impact factor corresponding to the mobile application $app_m$ operated by the $t^{th}$ type in the user history log.

According to a preferred embodiment of the present invention, the operations on mobile applications comprise at least one of viewing, downloading and using.

According to a preferred embodiment of the present invention, the system further comprises: an updating unit for adding a newly added mobile application in a mobile application store to a mobile application ontology base, and labelling corresponding category information and attribute information for the newly added mobile application; and the fourth calculation unit further for multiplying an average weight value of top-ranked mobile applications under the mobile application category to which the newly added mobile application belongs by a preset attenuation factor, so as to obtain a weight value of the newly added mobile application.

According to a preferred embodiment of the present invention, when calculating the degree of recommendation of a mobile application under the mobile application category, the first calculation unit is specifically used for:

calculating the degree of recommendation $rec_{app_m app_n}$ of recommending the mobile application $app_n$ to the user using the formula $rec_{app_m app_n} = R(concept_i, concept_j) \times w_{concept_j app_n} + k \times comatt(app_m, app_n)$ in the case where the designated mobile application is $app_m$;

where the mobile application category to which the mobile application $app_m$ belongs is $concept_i$, the mobile application category to which the mobile application $app_n$ belongs is $concept_j$, the mobile application category $concept_j$ belongs to the determined mobile application category, $R(concept_i, concept_j)$ is the relevance between the mobile application category $concept_i$ and the mobile application category $concept_j$, $w_{concept_j, app_n}$ is the weight value of the mobile application $app_n$ under the mobile application category $concept_j$, $comatt(app_m, app_n)$ is the number of identical attributes of the mobile application $app_n$ and the mobile application $app_m$, and k is a preset impact factor.

According to a preferred embodiment of the present invention, the pushing unit is specifically used for respectively extracting mobile applications with top-ranked degrees of recommendation from the determined mobile application category; and ranking the extracted mobile applications in an order from high to low of the degrees of recommendation, and taking n top-ranked mobile applications as recommendation results of the mobile applications and pushing same to the user, n being a preset number of recommendation results.

As can be seen from the technical solution above, the technical solution provided in the present invention has the following beneficial effects:

extracting mobile applications with top-ranked degrees of recommendation under a mobile application category with a relatively high relevance, and recommending a mobile application with the highest degree of recommendation therein to a user, such that the diversity of the recommended mobile application categories is guaranteed, and thus the diversity of the recommended mobile applications can be effectively improved.

BRIEF DESCRIPTION OF DRAWINGS

FIG. 1 is a schematic flowchart of a preferred embodiment for implementing a method for pushing a mobile application of the present invention.

DETAILED DESCRIPTION OF THE PREFERRED EMBODIMENTS

Figure 2:
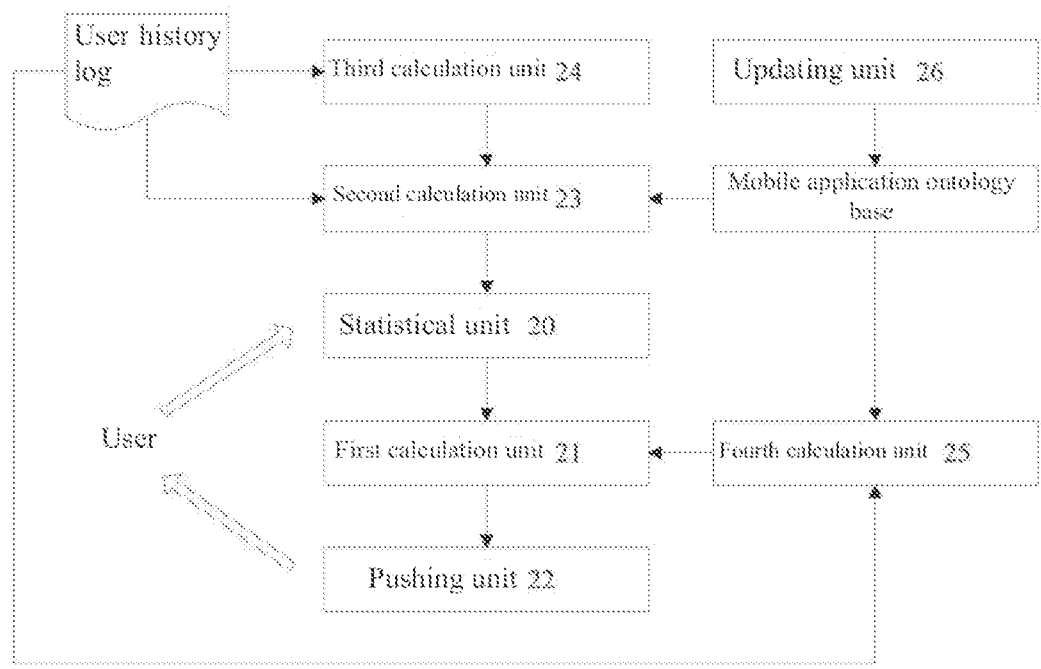
FIG. 2 is a structural schematic diagram of a preferred embodiment for implementing a system for pushing a mobile application of the present invention.

In order to make the objectives, technical solutions and advantages of the present invention more apparent, the present invention is described in detail hereinbelow in conjunction with the accompanying drawings and specific embodiments.

The basic idea of the present invention is: according to the pre-generated relevance of mobile application categories, determining more than one mobile application category with the highest relevance to a mobile application category of a mobile application designated by a user; according to pre-generated weight values of the mobile applications, calculating the degrees of recommendation of mobile applications under the mobile application category; and extracting mobile applications with top-ranked degrees of recommendation under each mobile application category, and according to a preset number of recommendation results, taking more than one mobile application with the highest degree of recommendation in the extracted mobile applications as recommendation results and pushing same to the user.

In order to make the objectives, technical solutions and advantages of the present invention more apparent, the present invention is described in detail hereinbelow in conjunction with the accompanying drawings and specific embodiments.

Provided in the present invention is a method for pushing a mobile application. FIG. 1 is a schematic flowchart of a preferred embodiment for implementing a method for pushing a mobile application of the present invention, and as shown in FIG. 1, the preferred embodiment comprises the following steps:

step 101, according to information about a user viewing or downloading a mobile application in a mobile application store and duration information about the user using the mobile application, the relevance between the mobile applications in a mobile application set which is viewed, downloaded and used by the user is calculated.

Specifically, a data platform of the mobile application store will store a user history log when the user uses the mobile application store, and the data platform stores the user history log in a text format and, with a set duration as a unit (such as every hour as a unit), saves the text of the user history log within a set duration in the same file; the user history log comprises information about the user viewing or downloading a mobile application in the mobile application store and duration information about the user using the mobile application, and certainly information about the mobile applications operated by other users can also be involved, taking the operations of viewing, downloading and using for example herein; wherein the information about the user viewing or downloading the mobile application in the mobile application store comprises a user identification (UID), an identification (package ID) of the mobile application viewed or downloaded by the user in the mobile application store and the time of the user viewing or downloading the mobile application in the mobile application store; and the duration information about the user using the mobile application comprises the user identification (UID). The identification (package ID) of the mobile application used by the user and the duration of the user using the mobile application.

The relevance between the mobile applications in a mobile application set which are viewed, downloaded and used by the user is calculated according to the information about the user viewing or downloading the mobile application in the mobile application store and the duration information about the user using the mobile application and using formula (1):

$$R(app_m, app_n) = \sum_{u=1}^{U} w_u \times \frac{s_{app_m} \times (k_1 + 1)}{s_{app_m} + K} \times \frac{s_{app_n} \times (k_2 + 1)}{s_{app_n} + k_2} \quad (1)$$

where $R(app_m, app_n)$ represents the relevance between the mobile application $app_m$ and the mobile application $app_n$ in the mobile application set, U represents a user set operating the mobile application $app_m$ and the mobile application $app_n$ simultaneously, $s_{app_m}$ and $s_{app_n}$ respectively represent score values allocated by a user u in the user set U for the $app_m$ and $app_n$; and $w_u$ represents the weight of the user u in the user set U, and $w_u$ can be calculated using formula (2):

$$w_u = \log \frac{N - n_u + 0.5}{n_u + 0.5} \quad (2)$$

where N represents the total number of mobile applications in the mobile application set, and $n_u$ represents the total number of mobile applications which are viewed, the mobile applications which are downloaded and the mobile applications which are used by the user u in the user set U.

It needs to be noted that the calculation method of the relevance mentioned in formula (1) is actually performing relevance calculation between each two mobile applications in the mobile application set and then summing same, and in formula (1), a BM25 algorithm is used to calculate the relevance between each two mobile applications; however, the present invention is not limited to this relevance calculation method, and relevance calculation methods such as transition probability and cosine formula can also be used, which will not be illustrated one by one herein.

The $s_{app_m}$ or $s_{app_n}$ is obtained using formula (3):

$$s_{app_m} = s_1 \times read_{app_m} + s_2 \times download_{app_m} + s_3 \times usetime_{app_m} \quad (3)$$

where $s_1$, $s_2$ and $s_3$ respectively represent basic scores of the mobile applications which are viewed, the mobile applications which are downloaded and the mobile applications which are used by the user u, and the basic scores respectively embody the impact degree of the operations of viewing, downloading and using on the $s_{app_m}$, and are preset values. In this preferred embodiment, $s_1$ equals 1, $s_2$ equals 2, and $s_3$ equals 1; $read_{app_m}$ represents whether the user u views the mobile application $app_m$, and if so, the $read_{app_m}$ equals 1, and if not, the $read_{app_m}$ equals 0; $download_{app_m}$ represents whether the user u downloads the mobile application $app_m$, and if so, the $download_{app_m}$ equals 1, and if not, the $download_{app_m}$ equals 0; and $usetime_{app_m}$ represents the duration of the user using the mobile application $app_m$, and for example, the duration of the user using the mobile application $app_m$ can be in minutes herein;

where $k_1$ and $k_2$ are adjustment factors, and in this preferred embodiment, $k_1$ equals 2, $k_2$ equals 1.2, and K is obtained using formula $$K = k_1 \times \left(1 - b + b \times \frac{n_u}{n_{avg}}\right);$$

where b is an adjustment factor, and in this preferred embodiment, b equals 0.75, $n_{avg}$ represents an average value of the total number of mobile applications which are viewed, the mobile applications which are downloaded and the mobile applications which are used by the user u.

In this preferred embodiment, the relevance between mobile applications can be calculated periodically, for example, a user history log within a previous month can be extracted every morning, and the relevance between the mobile applications is calculated according to the user history log.

Step 102, according to a mobile application ontology base, category information about the mobile applications in the mobile application set is obtained, and according to the category information about the mobile applications, the mobile applications are classified; and according to information about the user viewing or downloading a mobile application in a mobile application store, duration information about the user using the mobile application, and the calculated relevance between the mobile applications, the relevance between mobile application categories is calculated.

Specifically, the mobile application ontology base takes the identity of the mobile application (package ID) as a unit, and contains a name, category information and attribute information corresponding to the identity of the mobile application, for example, the mobile application ontology base can be as shown in table 1.

TABLE 1

| package ID | Name | Category information | Attribute information |
|---|---|---|---|
| 2730221082 | Tecent video hd | Practicality-player-video player | Variety, high definition, hd, cartoon, video, share, live, score, online |
| 3581535646 | Angry birds | Game-physics-based game-cast | Classic, bird, cute |

After the relevance between the mobile applications in the mobile application set is calculated, according to the identity of the mobile applications in the mobile application set, category information about each mobile application is obtained in the mobile application ontology base, and then according to the category information about the mobile applications, the mobile applications are classified to obtain more than one mobile application category corresponding to the mobile application set; and according to the calculated relevance between the mobile applications, formula (4) is used to calculate the relevance between the mobile application categories:

$$R(concept_i, concept_j) = \sum_{\substack{concept_{app_m} = concept_i; \\ concept_{app_n} = concept_j}}^{U} \frac{f_{app_m app_n}}{f_{app_m} + f_{app_n}} \times R(app_m, app_n) \quad (4)$$

where $concept_i$ and $concept_j$ respectively represent the mobile application categories to which the mobile application $app_m$ and the mobile application $app_n$ belong, $R(app_m, app_n)$ represents the relevance between the mobile application $app_m$ and the mobile application $app_n$ in the mobile application set calculated by formula (1), and $R(concept_i, concept_j)$ represents the relevance between the mobile application category $concept_i$ and the mobile application category $concept_j$; $f_{app_m}$ represents the total number of users viewing the mobile application $app_m$, users downloading the mobile application $app_m$ and users using the mobile application $app_m$, and $f_{app_n}$ represents the total number of users viewing the mobile application $app_n$, users downloading the mobile application $app_n$ and users using the mobile application $app_n$; statistics can be taken of the total number of users viewing the mobile applications, users downloading the mobile applications and users using the mobile applications herein according to a user history log; and $f_{app_m app_n}$ represents the total number of users contained in an intersection of a set of users viewing the mobile application $app_m$, users downloading the mobile application $app_m$ and users using the mobile application $app_m$ and a set of users viewing the mobile application $app_n$, users downloading the mobile application $app_n$ and users using the mobile application $app_n$. Actually, the meaning of formula (4) is respectively performing relevance calculation on mobile applications which are operated by the user and are respectively from two categories concept$_i$ and concept$_j$ and then multiplying same by a coefficient and summing same, and the coefficient in formula (4) is $$\frac{f_{app_m app_n}}{f_{app_m} + f_{app_n}},$$

but is not limited to the calculation method of this coefficient.

Step 103, a newly added mobile application in the mobile application store is added to a mobile application ontology base, and corresponding category information and attribute information are labelled for the newly added mobile application.

Specifically, after the relevance of the mobile application categories is calculated, the newly added mobile application in the mobile application store can also be added to the ontology base, a package ID is allocated for the newly added mobile application, and corresponding category information and attribute information are labelled; wherein according to the name and introduction of the mobile application provided by a mobile application owner, a mobile application automatic labelling system can be used to automatically label the category information and the attribute information for the newly added mobile application.

It needs to be noted that this step is for the purpose of solving the problem that cold start cannot be performed on the newly added mobile application, but is not a necessary step of the present invention.

Step 104, according to information about the user viewing or downloading a mobile application in the mobile application store and duration information about the user using the mobile application, weight values of mobile applications which are not newly added under the mobile application category in the ontology base are calculated; and an average weight value of top-ranked mobile applications under the mobile application category to which the newly added mobile application belongs is multiplied by a preset attenuation factor, so as to obtain a weight value of the newly added mobile application.

Specifically, the weight values of the mobile applications under the mobile application category in the mobile application ontology base are calculated using formula (5):

$$w_{concept_i app_m} = g_1 \times \frac{r_{app_m}}{r_{concept_i}} + g_2 \times \frac{d_{app_m}}{d_{concept_i}} + g_3 \times \frac{u_{app_m}}{u_{concept_i}} \quad (5)$$

where $w_{concept_i app_m}$ represents the weight value of the mobile application app$_m$ in the mobile application category concept$_i$, $r_{app_m}$ represents the total number of times of the mobile application app$_m$ being viewed in the user history log, $d_{app_m}$ represents the total number of times the mobile application app$_m$ is downloaded in the user history log, $u_{app_m}$ represents the total duration that the mobile application app$_m$ is used in the user history log, and the unit of the $u_{app_m}$ can be minutes; $r_{concept_i}$ represents the total number of times all the mobile applications under the mobile application category concept$_i$ are viewed in the user history log; $d_{concept_i}$ represents the total number of times all the mobile applications under the mobile application category concept$_i$ are downloaded in the user history log, and $u_{concept_i}$ represents total duration that all the mobile applications under the mobile application category concept$_i$ are used in the user history log; $g_1$ represents an impact factor corresponding to the mobile application app$_m$ viewed in the user history log, $g_2$ represents an impact factor corresponding to the mobile application app$_m$ downloaded in the user history log, $g_3$ represents an impact factor of the total duration of the mobile application app$_m$ staying in the user history log, in this preferred embodiment, $g_1$ is equal to 0.2, $g_2$ is equal to 0.4, and $g_3$ is equal to 0.4; and the correlation between the identity of the mobile application and the weight value of the mobile application is stored.

If the mobile application app$_m$ is a newly added mobile application in the mobile application ontology base, the newly added mobile application uses a default weight value, and the calculation method for the default weight value is to multiply an average value of the weight values of several (such as three) mobile applications with highest weight values in the mobile application category concept$_i$ by an attenuation factor, in this preferred embodiment, the attenuation factor being equal to 0.4.

Step 105, when the mobile application designated by the user is received, according to the relevance of the mobile application categories, more than one mobile application category with the highest relevance to the mobile application category of the designated mobile application is determined; according to weight values of mobile applications, the degrees of recommendation of mobile applications under the mobile application category are calculated; and mobile applications with top-ranked degrees of recommendation under each mobile application category are extracted, and according to a preset number of recommendation results, more than one mobile application with the highest degree of recommendation in the extracted mobile applications is taken as the recommendation results and pushed to the user.

Specifically, when the user searches for or downloads the mobile application app$_m$ in the mobile application store, the searched or downloaded mobile application is taken as a designated mobile application, and according to an identity of the designated mobile application, a query is performed in the mobile application ontology base to obtain the mobile application category concept$_i$ of the mobile application app$_m$, the mobile application categories in the mobile application ontology base are ranked in an order of high to low of the relevance to the mobile application category concept$_i$, and then according to the preset recommendation result number n, more than n (such as 2n) mobile application categories with the top-ranked relevance are extracted.

The degree of recommendation of each mobile application in the extracted 2n mobile application categories is calculated using formula (6):

$$rec_{app_m app_n} = R(concept_i, concept_j) \times w_{concept_j app_n} + k \times comatt(app_m, app_n) \quad (6)$$

where $rec_{app_m app_n}$ is the degree of recommendation of recommending the mobile application app$_n$ to the user when the mobile application app$_m$ is designated, the mobile application category to which the mobile application app$_m$ belongs is concept$_i$, the mobile application category to which the mobile application app$_n$ belongs is concept$_j$, the mobile application category concept$_j$ is located in the 2n mobile application categories with the highest relevance to the mobile application category concept$_i$, R(concept$_i$,concept$_j$) is the relevance between the mobile application category concept$_i$ and the mobile application category concept$_j$, $w_{concept_j app_n}$ is the weight value of the mobile application app$_n$ under the mobile application category concept$_j$, comatt(app$_m$,app$_n$) is the number of identical attributes of the mobile application $app_n$ and the mobile application $app_m$, and k is an impact factor, in this preferred embodiment, k being equal to 2.

After the degrees of recommendation of the mobile applications are calculated, according to the user history log, the mobile applications of which the degrees of recommendation are calculated are screened, and the mobile applications that have been downloaded or used therein by the user are deleted; taking a mobile application category as a unit, according to an order of high to low of the degree of recommendation, the mobile applications under each mobile application category are ranked, then the top two ranked mobile applications in the ranking of the degree of recommendation under each mobile application category are extracted, and the mobile applications extracted from each mobile application category are ranked according to an order of high to low of the degree of recommendation; and according to the preset recommendation result number n, the top-n ranked mobile applications are taken as a recommendation result of the mobile applications, and the recommendation result is pushed to the user.

In order to realize the above-mentioned method, further provided in the present invention is a system for pushing a mobile application. FIG. 2 is a structural schematic diagram of a preferred embodiment for implementing a system for pushing a mobile application of the present invention. As shown in FIG. 2, the system comprises: a statistical unit 20, a first calculation unit 21, and a pushing unit 22; wherein the statistical unit 20 is used for determining, according to the pre-generated relevance of mobile application categories, more than one mobile application category with the highest relevance to the mobile application category of a mobile application designated by a user;

the first calculation unit 21 is used to calculate, according to pre-generated weight values of the mobile applications, the degrees of recommendation of the mobile applications under the mobile application category; and the pushing unit 22 is used for extracting mobile applications with top-ranked degrees of recommendation under each mobile application category, and according to a preset number of recommendation results, taking more than one mobile application with the highest degree of recommendation in the extracted mobile applications as recommendation results and pushing same to the user.

The system further comprises: a second calculation unit 23 for pre-generating the relevance of mobile application categories;

the second calculation unit 23 pre-generating the relevance of the mobile application categories specifically comprises: according to a mobile application ontology base, obtaining category information about mobile applications, and according to the category information about the mobile applications, classifying the mobile applications which are viewed, downloaded and used by the user; and according to acquired information about the user viewing or downloading a mobile application in a mobile application store, duration information about the user using the mobile application, and the pre-generated relevance between the mobile applications, calculating the relevance between mobile application categories.

The system further comprises a third calculation unit 24 for pre-generating the relevance between mobile applications;

the third calculation unit 24 pre-generating the relevance between mobile applications specifically comprises:

calculating the relevance between the mobile applications in a mobile application set which are viewed, downloaded and used by the user according to the information about the user viewing or downloading the mobile application in the mobile application store and the duration information about the user using the mobile application and using the following formula:

$$R(app_m, app_n) = \sum_{u=1}^{U} w_u \times \frac{s_{app_m} \times (k_1 + 1)}{s_{app_m} + K} \times \frac{s_{app_n} \times (k_2 + 1)}{s_{app_n} + k_2}$$

where $R(app_m, app_n)$ represents the relevance between the mobile application $app_m$ and the mobile application $app_n$ in a mobile application set, U represents a user set using the mobile application $app_m$ and the mobile application $app_n$ simultaneously, $s_{app_m}$ and $s_{app_n}$ respectively represent score values allocated by a user u in a user set U for the $app_m$ and $app_n$; $w_u$ represents the weight of the user u in the user set U, $$K = k_1 \times \left(1 - b + b \times \frac{n_u}{n_{avg}}\right),$$

$k_1$ equals 2, $k_2$ equals 1.2, and b equals 0.75, $n_u$ represents the total number of mobile applications viewed, downloaded and used by the user u in the user set U, and $n_{avg}$ represents an average value of the total number of mobile applications viewed by the user u, the total number of mobile applications downloaded by the user u and the total number of mobile applications used by the user u.

The weight $w_u$ of the user u in the user set U is $$w_u = \log \frac{N - n_u + 0.5}{n_u + 0.5},$$

where N represents the total number of mobile applications in the mobile application set, $n_u$ represents the total number of mobile applications viewed, downloaded and used by the user u in the user set U.

The value $s_{app_m}$ allocated by the user for the mobile application $app_m$ is $s_{app_m} = s_1 \times read_{app_m} + s_2 \times download_{app_m} + s_3 \times usetime_{app_m}$;

where $s_1$ equals 1, $s_2$ equals 2, and $s_3$ equals 1; when the user views the mobile application $app_m$, $read_{app_m}$ equals 1, and when the user does not view the mobile application $app_m$, $read_{app_m}$ equals 0; when the user downloads the mobile application $app_m$, $download_{app_m}$ equals 1, and when the user does not download the mobile application $app_m$, $download_{app_m}$ equals 0; $usetime_{app_m}$ is the duration of the user using the mobile application $app_m$.

The second calculation unit 23 calculating the relevance between mobile application categories specifically comprises:

calculating the relevance between the mobile application category $concept_i$ and the mobile application category $concept_j$ using the following formula:

$$R(concept_i, concept_j) = \sum_{\substack{concept_{app_m} = concept_i, \\ concept_{app_n} = concept_j}}^{U} \frac{f_{app_m app_n}}{f_{app_m} + f_{app_n}} \times R(app_m, app_n)$$

where $concept_i$ and $concept_j$ are respectively mobile application categories to which the mobile application $app_m$ and the mobile application $app_n$ belong, $R(app_m, app_n)$ is the relevance between the mobile application $app_m$ and the mobile application $app_n$ in the mobile application set; $f_{app_m}$ represents the total number of users viewing the mobile application $app_m$, users downloading the mobile application $app_m$ and users using the mobile application $app_m$, and $f_{app_n}$ represents the total number of users viewing the mobile application $app_n$, users downloading the mobile application $app_n$ and users using the mobile application $app_n$, and $f_{app_m app_n}$ represents the total number of users contained in an intersection of a set of users viewing the mobile application $app_m$, users downloading the mobile application $app_m$ and users using the mobile application $app_m$ and a set of users viewing the mobile application $app_n$, users downloading the mobile application $app_n$ and users using the mobile application $app_n$.

The system further comprises a fourth calculation unit 25 for pre-generating weight values of mobile applications;

the fourth calculation unit 25 pre-generating weight values of mobile applications specifically comprises:

calculating the weight value of the mobile application $app_m$ in the mobile application category $concept_i$ using the following formula:

$$w_{concept_i app_m} = g_1 \times \frac{r_{app_m}}{r_{concept_i}} + g_2 \times \frac{d_{app_m}}{d_{concept_i}} + g_3 \times \frac{u_{app_m}}{u_{concept_i}} \quad (5)$$

where $r_{app_m}$, $d_{app_m}$ and $u_{app_m}$ are respectively the total number of times that the mobile application $app_m$ is viewed, the total number of times downloaded and the total duration of use in the user history log; $r_{concept_i}$, $d_{concept_i}$ and $u_{concept_i}$ are respectively the total number of times that all the mobile applications under the mobile application category $concept_i$ are viewed, the total number of times downloaded and the total duration of use in the user history log; and $g_1$ equals 0.2, $g_2$ equals 0.4, and $g_3$ equals 0.4.

The system further comprises: an updating unit 26;

wherein the updating unit 26 is used for adding a newly added mobile application in a mobile application store to a mobile application ontology base, and labelling corresponding category information and attribute information for the newly added mobile application; and the fourth calculation unit 25 further for multiplying an average weight value of top-ranked mobile applications under the mobile application category to which the newly added mobile application belongs by a preset attenuation factor, so as to obtain a weight value of the newly added mobile application.

The first calculation unit 21 calculating the degrees of recommendation of the mobile applications under the mobile application category specifically comprises:

calculating the degree of recommendation of each mobile application in the mobile application category using the following formula:

$$rec_{app_m app_n} = R(concept_i, concept_j) \times w_{concept_j app_n} + k \times comatt(app_m, app_n)$$

where $rec_{app_m app_n}$ is the degree of recommendation of recommending the mobile application $app_n$ to the user when the mobile application $app_m$ is designated, the mobile application category to which the mobile application $app_m$ belongs is $concept_i$, the mobile application category to which the mobile application $app_n$ belongs is $concept_j$, the mobile application category $concept_j$ is located in the mobile application category with the highest relevance to the mobile application category $concept_i$, $R(concept_i, concept_j)$ is the relevance between the mobile application category $concept_i$ and the mobile application category $concept_j$, $w_{concept_j app_n}$ is the weight value of the mobile application $app_n$ under the mobile application category $concept_j$, $comatt(app_m, app_n)$ is the number of identical attributes of the mobile application $app_n$ and the mobile application $app_m$, and k equals 2.

The above-mentioned technical solution of the present invention has the following beneficial effects:

1. mobile applications with top-ranked degrees of recommendation under a mobile application category with a relatively high relevance are extracted, and a mobile application with the highest degree of recommendation therein is recommended to a user, such that the diversity of the recommended mobile application categories is guaranteed, and thus the diversity of the recommended mobile applications can be effectively improved.

2. After the calculation of the relevance of the mobile application categories is completed, a newly added mobile application is added to an ontology base and category information and attribute information are configured; therefore, when the degree of recommendation of the mobile application is calculated, the newly added mobile application can be incorporated into the calculation range according to the ontology base, the degree of recommendation of the newly added mobile application can be effectively calculated, and the newly added mobile application can also be pushed to the user effectively according to the degree of recommendation, thereby being able to effectively solve the problem of cold start of the newly added mobile application.

The foregoing are merely preferred embodiments of the present invention, but are not intended to limit the present invention. Any modifications, equivalent replacements, or improvements made without departing from the spirit and principle of the present invention shall fall within the scope of protection of the present invention.

What is claimed is:

1. A method for pushing a mobile application, comprising:

calculating, according to information about mobile applications operated by each user in a mobile application store and a pre-generated relevance between the mobile applications, a relevance between mobile application categories in the mobile application store, said calculating including calculating the relevance between first and second mobile application categories of the mobile application categories based on:

multiplying a coefficient with the pre-generated relevance between each pair of the mobile applications in the first and second mobile application categories, the each pair including two mobile applications respectively from the first and second mobile application categories; and summing a result of the multiplying of each pair;

obtaining a designated mobile application searched or downloaded from the mobile application store by a user;

determining more than one mobile application category with top relevance to a mobile application category to which the designated mobile application belongs;

calculating, according to pre-generated weight values of mobile applications, a degree of recommendation of each mobile application under the determined mobile application category; and selecting, according to a principle of high to low of the degree of recommendation of each mobile application under the determined mobile application category, a preset recommendation result number of mobile applications as a recommendation result and pushing the recommendation result.

2. The method of claim 1, wherein said determining comprises:
classifying, according to category information about each mobile application in a mobile application ontology base, the mobile applications operated by each user.

3. The method of claim 1, wherein said calculating the relevance between the mobile application categories includes pre-generating the pre-generated relevance between the mobile applications by:
calculating a relevance $R(app_m, app_n)$ between the mobile applications $app_m$ and $app_n$ in accordance with:

$$R(app_m, app_n) = \sum_{u=1}^{U} w_u \times \frac{s_{app_m} \times (k_1 + 1)}{s_{app_m} + K} \times \frac{s_{app_n} \times (k_2 + 1)}{s_{app_n} + k_2}$$

where U represents a user set operating the mobile application $app_m$ and the mobile application $app_n$ simultaneously, and $s_{app_m}$ and $s_{app_n}$ respectively represent score values allocated by a user u in the user set U for the $app_m$ and $app_n$; $w_u$ represents a weight of the user u in the user set U, $$K = k_1 \times \left(1 - b + b \times \frac{n_u}{n_{avg}}\right),$$

$k_1$ and $k_2$ are preset adjustment factors,
$n_u$ represents a total number of mobile applications operated by the user u in the user set U, b is an adjustment factor, and $n_{avg}$ represents an average of the total number of mobile applications operated by the user u.

4. The method of claim 3, wherein the weight $w_u$ of the user u in the user set U is $$w_u = \log \frac{N - n_u + 0.5}{n_u + 0.5};$$

where N represents a total number of mobile applications operated by each user.

5. The method of claim 3, wherein the score value $s_{app_m}$ allocated by the user u for the mobile application $app_m$ is:

$$s_{app_m} = \sum_{t=1}^{T} s_t \times B_{t,app_m};$$

where t represents a $t^{th}$ type of operating the mobile application $app_m$, T represents a total number of types of operating the mobile application $app_m$, and $s_t$ represents a basic score of the user u operating the mobile application $app_m$; $B_{t,app_m}$ includes at least one of an indication value of whether the user u performs the $t^{th}$ type of operation on the mobile application $app_m$ and duration information about the user u performing the $t^{th}$ type of operation on the mobile application $app_m$.

6. The method of claim 1, wherein said calculating the relevance between the mobile application categories comprises:
calculating a relevance $R(concept_i, concept_j)$ between the first mobile application category $concept_i$ and the second mobile application category $concept_j$ in accordance with:

$$R(concept_i, concept_j) = \sum_{\substack{concept_{app_m} = concept_i, \\ concept_{app_n} = concept_j}}^{U} \frac{f_{app_m app_n}}{f_{app_m} + f_{app_n}} \times R(app_m, app_n)$$

where $concept_i$ and $concept_j$ are respectively the mobile application categories to which the first mobile application $app_m$ and the second mobile application $app_n$ belong, $R(app_m, app_n)$ is a relevance between the first mobile application $app_m$ and the second mobile application $app_n$, $f_{app_m}$ represents a total number of users operating the first mobile application $app_m$, $f_{app_n}$ represents a total number of users operating the second mobile application $app_n$, and $f_{app_m app_n}$ represents a total number of users contained in an intersection of a user set operating the first mobile application $app_m$ and a user set operating the second mobile application $app_n$.

7. The method of claim 1, wherein said calculating the relevance between the mobile application categories includes determining the pre-generating weight values of the mobile applications by:
calculating a weight value $w_{concept_i app_m}$ of a mobile application $app_m$ in a mobile application category $concept_i$ in accordance with:

$$w_{concept_i app_m} = \sum_{t=1}^{T} g_t \times \frac{A_{t,app_m}}{A_{t,concept_i}}$$

where t represents a $t^{th}$ type of operating the mobile application $app_m$, T represents a total number of types of operating the mobile application $app_m$, $A_{t,app_m}$ represents at least one of a total number of times and a total duration of the mobile application $app_m$ being operated by the $t^{th}$ type in a user history log, $A_{t,concept_i}$ represents at least one of total number of times and a total duration of all of the mobile applications under the mobile application category $concept_i$ being operated by the $t^{th}$ type in the user history log; and $g_t$ represents an impact factor corresponding to the mobile application $app_m$ operated by the $t^{th}$ type in the user history log.

8. The method of claim 7, wherein the operating on the mobile application $app_m$ comprise at least one of viewing, downloading and using.

9. The method of claim 1, further comprising:
adding a newly-added mobile application in a mobile application store to a mobile application ontology base;
labeling corresponding category information and attribute information for the newly-added mobile application;
multiplying an average weight value of top-ranked mobile applications under the mobile application category to which the newly added mobile application belongs by a preset attenuation factor; and
obtaining a weight value of the newly added mobile application based upon said multiplying.

10. The method of claim 1, wherein said calculating the degree of recommendation of each mobile application comprises:

calculating a degree of recommendation $rec_{app_m,app_n}$ of recommending the mobile application $app_n$ to the user based upon $rec_{app_m,app_n}=R(concept_i,concept_j)\times w_{concept_j,app_n}+k\times comatt(app_m,app_n)$ where $app_m$ is the designated mobile application, the mobile application category to which the designated mobile application $app_m$ belongs is $concept_i$, the mobile application category to which the mobile application $app_n$ belongs is $concept_j$, the mobile application category $concept_j$ belongs to the determined mobile application category, $R(concept_i,concept_j)$ is the relevance between the mobile application category $concept_i$ and the mobile application category $concept_j$, $w_{concept_j,app_n}$ is a weight value of the mobile application $app_n$ under the mobile application category $concept_j$, $comatt(app_m,app_n)$ is a number of identical attributes of the mobile application $app_n$ and the mobile application $app_m$, and k is a preset impact factor.

11. The method of claim 1, wherein said selecting the preset recommendation result number of the mobile applications comprises:

respectively extracting mobile applications with top-ranked degrees of recommendation from the determined mobile application category;

ranking the extracted mobile applications in an order from high to low of the degree of recommendation; and taking a predetermined number of top-ranked mobile applications as the recommendation result; and pushing the predetermined number of the top-ranked mobile applications.

12. A system for pushing a mobile application, comprising:

a processor; and a memory having one or more programs stored thereon for instructing said processor, the one or more programs including:

instruction for calculating, according to information about mobile applications operated by each user in a mobile application store and a pre-generated relevance between the mobile applications, a relevance between mobile application categories in the mobile application store, the relevance between first and second mobile application categories of the mobile application categories being based on:

multiplying a coefficient with the pre-generated relevance between each pair of the mobile applications in the first and second mobile application categories, the each pair including two mobile applications respectively from the first and second mobile application categories; and summing a result of the multiplying of each pair;

instruction for obtaining a designated mobile application searched or downloaded from the mobile application store by a user;

instruction for determining more than one mobile application category with top relevance to a mobile application category to which the designated mobile application belongs;

instruction for calculating, according to pre-generated weight values of mobile applications, a degree of recommendation of each mobile application under the determined mobile application category; and instruction for selecting, according to a principle of high to low of a degree of recommendation of each mobile application under the determined mobile application category, a preset recommendation result number of the mobile applications as a recommendation result and pushing the recommendation result.

13. The system of claim 12, wherein the one or more programs includes instruction for classifying, according to category information about each mobile application in a mobile application ontology base, the mobile applications operated by each user.

14. The system of claim 12, wherein the one or more programs includes instruction for calculating the relevance between mobile application categories by calculating a relevance $R(concept_i,concept_j)$ between the first mobile application category $concept_i$ and the second mobile application category $concept_j$ based upon:

$$R(concept_i, concept_j) = \sum_{\substack{concept_{app_m}=concept_i, \\ concept_{app_n}=concept_j}}^{U} \frac{f_{app_m,app_n}}{f_{app_m}+f_{app_n}} \times R(app_m, app_n)$$

where $concept_i$ and $concept_j$ are respectively the mobile application categories to which the first mobile application $app_m$ and the second mobile application $app_n$ belong, $R(app_m,app_n)$ is a relevance between the first mobile application $app_m$ and the second mobile application $app_n$, $f_{app_m}$ represents a total number of users operating the first mobile application $app_m$, $f_{app_n}$ represents a total number of users operating the second mobile application $app_n$, and $f_{app_m,app_n}$ represents a total number of users contained in an intersection of a user set operating the first mobile application $app_m$ and a user set operating the second mobile application $app_n$.

15. The system of claim 12, wherein the one or more programs includes instruction for pre-generating weight values of mobile applications by calculating a weight value $w_{concept_i,app_m}$ of a mobile application $app_m$ in the mobile application category $concept_i$ based upon:

$$w_{concept_i,app_m} = \sum_{t=1}^{T} g_t \times \frac{A_{t,app_m}}{A_{t,concept_i}}$$

where t represents a $t^{th}$ type of operating the mobile application $app_m$, T represents a total number of types of operating the mobile application $app_m$, $A_{t,app_m}$ represents at least one of a total number of times and a total duration of the mobile application $app_m$ being operated by the $t^{th}$ type in a user history log, $A_{t,concept_i}$ represents at least one of total number of times and a total duration of all of the mobile applications under the mobile application category $concept_i$ being operated by the $t^{th}$ type in the user history log; and $g_t$ represents an impact factor corresponding to the mobile application $app_m$ operated by the $t^{th}$ type in the user history log.

16. The system of claim 15, wherein the operating on the mobile application comprise at least one of viewing, downloading and using.

17. The system of claim 12, wherein the one or more programs includes:

instruction for adding a newly-added mobile application in a mobile application store to a mobile application ontology base and labeling corresponding category information and attribute information for the newly-added mobile application; and instruction for multiplying an average weight value of top-ranked mobile applications under the mobile application category to which the newly added mobile application belongs by a preset attenuation factor so as to obtain a weight value of the newly-added mobile application.

18. The system of claim 12, wherein the one or more programs includes instruction for calculating the degree of recommendation of a mobile application under said mobile application category by calculating a degree of recommendation $rec_{app_m,app_n}$ of recommending a mobile application $app_n$ to the user based upon $rec_{app_m,app_n} = R(concept_i, concept_j) \times w_{concept_j,app_n} + k \times comatt(app_m, app_n)$ where $app_m$ is the designated mobile application, the mobile application category to which the designated mobile application $app_m$ belongs is $concept_i$, the mobile application category to which the mobile application $app_n$ belongs is $concept_j$, the mobile application category $concept_j$ belongs to the determined mobile application category, $R(concept_i, concept_j)$ is the relevance between the mobile application category $concept_i$ and the mobile application category $concept_j$, $w_{concept_j,app_n}$ is a weight value of the mobile application $app_n$ under the mobile application category $concept_j$, $comatt(app_m, app_n)$ is a number of identical attributes of the mobile application $app_n$ and the mobile application $app_m$, and k is a preset impact factor.

19. The system of claim 12, wherein the one or more programs includes instruction for respectively extracting mobile applications with top-ranked degrees of recommendation from the determined mobile application category, ranks the extracted mobile applications in an order from high to low of the degree of recommendation, and takes a predetermined number of top-ranked mobile applications as the recommendation result.

20. A non-volatile computer storage medium including at least one program for pushing a mobile application when implemented by a processor, comprising:
instruction for calculating, according to information about mobile applications operated by each user in a mobile application store and a pre-generated relevance between the mobile applications, a relevance between mobile application categories in the mobile application store, the relevance between first and second mobile application categories of the mobile application categories being based on:
multiplying a coefficient with the pre-generated relevance between each pair of the mobile applications in the first and second mobile application categories, the each pair including two mobile applications respectively from the first and second mobile application categories; and
summing a result of the multiplying of each pair;
instruction for obtaining a designated mobile application searched or downloaded from the mobile application store by a user;
instruction for determining more than one mobile application category with top relevance to a mobile application category to which a designated mobile application belongs;
instruction for calculating, according to pre-generated weight values of mobile applications, a degree of recommendation of each mobile application under the determined mobile application category; and
instruction for selecting, according to a principle of high to low of the degree of recommendation of each mobile application under the determined mobile application category, a preset recommendation result number of mobile applications as a recommendation result and pushing the recommendation result.

* * * * *